(12) United States Patent
Karmiol et al.

(10) Patent No.: US 11,996,593 B1
(45) Date of Patent: May 28, 2024

(54) INTEGRATED ELECTROCHEMICAL NUCLEAR DECONTAMINATION SYSTEM

(71) Applicant: Triad National Security, LLC, Los Alamos, NM (US)

(72) Inventors: Benjamin Karmiol, Santa Fe, NM (US); Sean Peter Walsh, Los Alamos, NM (US); David Anthony Tyler Rodriguez, White Rock, NM (US); Jared Tyler Stritzinger, Los Alamos, NM (US); Steven Douglas McKee, Los Alamos, NM (US); Kirk Weisbrod, Los Alamos, NM (US); Jeremy Jacob Monroe, White Rock, NM (US); Gabriel Andrade, White Rock, NM (US); Quinn McCulloch, White Rock, NM (US); Janelle Droessler, Los Alamos, NM (US); Alp Tugrul Findikoglu, Santa Fe, NM (US); Taeho Ju, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 286 days.

(21) Appl. No.: 17/334,006

(22) Filed: May 28, 2021

Related U.S. Application Data

(60) Provisional application No. 63/032,139, filed on May 29, 2020.

(51) Int. Cl.
  *H01M 8/04* (2016.01)
  *G21F 9/00* (2006.01)
  *H01M 8/04186* (2016.01)

(52) U.S. Cl.
  CPC ........ *H01M 8/04186* (2013.01); *G21F 9/004* (2013.01)

(58) Field of Classification Search
  CPC ...... H01M 8/04; H01M 8/04186; G21F 9/004
  USPC .......................................... 588/302
  See application file for complete search history.

(56) References Cited

U.S. PATENT DOCUMENTS

2005/0245784 A1* 11/2005 Carson .................... A61L 2/025
  205/687

FOREIGN PATENT DOCUMENTS

| CN | 109478437 A | * | 3/2019 | ......... G21C 17/0225 |
| TW | 529041 B | * | 4/2003 | ............. G21F 9/004 |

* cited by examiner

Primary Examiner — Edward M Johnson
(74) Attorney, Agent, or Firm — Alston & Bird LLP

(57) ABSTRACT

An electrochemical cell that oxidizes a solution provides a continuous and stable supply of an oxidizing ion solution to a fixture or vessel used for the purposes of decontaminating metal and metal alloys. The electrochemical cell includes an anode compartment that oxidizes the solution in nitric acid or methane sulfonic acid at a rate equal to or greater than a rate of reduction, or generates the oxidizing ions prior to use in a batch. The electrochemical cell is part of a larger system that facilitates online measurement system which measures the oxidizing ion solution and the dissolved $PuO_2$, $UO_2$, $AmO_2$, other radionuclides, or other contaminates in real-time. Solution decontamination system removes the dissolved $PuO_2/UO_2/AmO_2$, other radionuclides, or other contaminates from the oxidizing ion solution, real time acoustic monitoring of the thickness of the surface being contaminated, and automation of a delivery system facilitates flow between surface and electrochemical cell.

10 Claims, 12 Drawing Sheets

INTEGRATED ELECTROCHEMICAL NUCLEAR DECONTAMINATION SYSTEM

CROSS REFERENCE TO RELATED APPLICATION

This application claims the benefit of, and claims priority to, U.S. provisional application No. 63/032,139, filed May 29, 2021. The subject matter thereof is hereby incorporated herein by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention relates to a nuclear decontamination system, and more particularly, to an integrated electrochemical nuclear decontamination system.

BACKGROUND

Current technology is limited to mostly once-through cleaning systems that have difficulty cleaning highly contaminated metal surfaces because the surfaces are resistant to etching, and the contamination is difficult to dissolve. Even when an effective chemical cleaning solution is found; it is hard to recycle the chemical cleaning solution; its effectiveness is rapidly reduced during decontamination.

Accordingly, an improved nuclear decontamination system may be beneficial.

SUMMARY

Certain embodiments of the present invention may provide solutions to the problems and needs in the art that have not yet been fully identified, appreciated, or solved by current nuclear decontamination technologies. For example, some embodiments of the present invention pertain to an integrated electrochemical nuclear decontamination system.

An electrochemical cell configured to oxidize a solution, providing a continuous and stable supply of an oxidizing ion solution to a fixture or vessel used for the purposes of decontaminating metal and metal alloys. The electrochemical cell includes an anode compartment configured to oxidize the solution (nitric acid or methane sulfonic acid containing Co, Ce, Ag as the oxidant) at a rate equal to or greater than a rate of reduction, or the oxidant may be generated in a batch in advance. It is understood that the oxidants (referred to above as Co, Ce, Ag) are in metal nitrate or metal methanesulfonate forms (e.g. Co(II) in nitric acid is $Co(NO_3)_2$, and Co(III) in nitric acid is $Co(NO_3)_3$, but throughout the rest of the document are simply referred to as Co(II), Co(III), Ce(III), Ce(IV), etc. The electrochemical cell is also capable of reducing the oxidizing ion, which allows for safer storage. This reduction capability is also necessary for removal of impurities/contaminants without damaging separation equipment and reagents.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
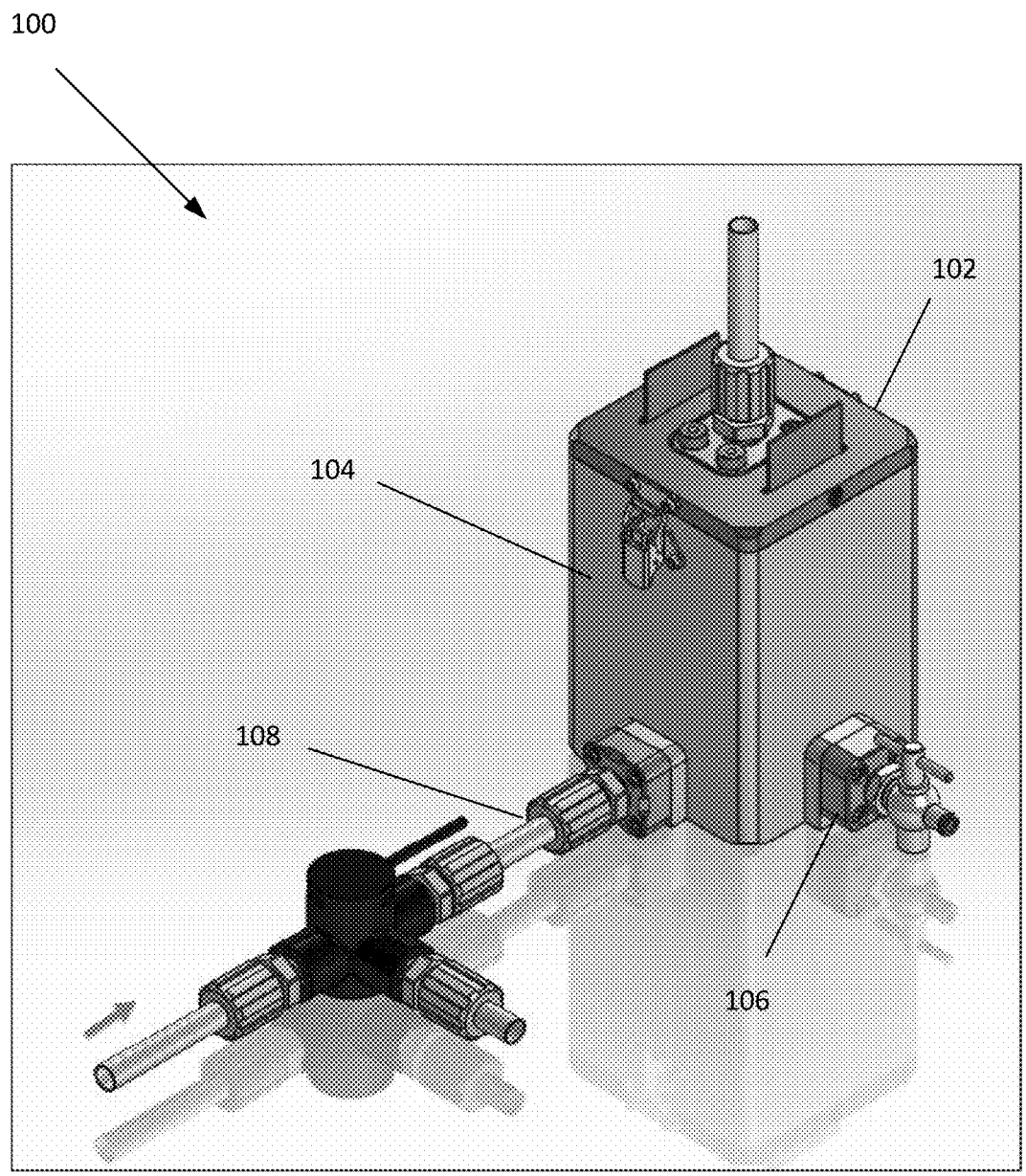
FIG. 1 is a diagram illustrating a perspective view of an electrochemical cell, according to an embodiment of the present invention.

Some embodiments of the present invention generally pertain to an integrated electrochemical nuclear decontamination system (hereinafter the "nuclear decontamination system"). The nuclear decontamination system is self-contained, efficient, semi-or fully-automated for use with metals and metal alloys. The nuclear decontamination system may be scaled up or down depending on the embodiments.

The nuclear decontamination system may include multiple designs and configurations. For example, in one embodiment, the nuclear decontamination system operates at approximately atmospheric pressure and cleans contaminated parts (e.g., tools, capsules, and containers) in a bath. In another embodiment, the nuclear decontamination system operates at less than atmospheric pressure so that a suction head fixture could be attached to the contaminated surfaces (e.g. a glovebox or a hood). In yet another embodiment, the nuclear decontamination system injects a solution into one or more tanks, and from there, the solution is sucked from the one or more tanks. In all of these embodiments, the solution is continuously recycled through the electrochemical cell to ensure that oxidizing ion concentration is kept nearly stable, or generated in advance as a batch.

Although the decontamination system discussed herein is used with respect to nuclear systems; the embodiments described herein are not limited to nuclear system. In some embodiments, the decontamination system may be used with system related to oil and gas, or any other industry that requires cleaning metal or metal alloys.

Electrochemical Cell

In some embodiments, electrochemical cell includes an anode, a cathode, and a power supply. The electrochemical cell may oxidize Ce(III) to Ce(IV), Co(II) to Co(III) or Ag(I) to Ag(II) in nitric acid or methane sulfonic acid at a rate equal to or greater than the rate of reduction to provide a continuous/stable supply of an oxidizing ion solution to a fixture or vessel used for the purposes of decontaminating metal and metal alloys. The system can also be used by generating a large quantity of the oxidant in advance, and thus continuous generation is not always needed. In one embodiment, the oxidizing ion solution is delivered to the fixture or vessel from the electrochemical cell, and then back to the electrochemical cell by way of a pump or a series of pumps in a continuous loop.

The oxidizing ion solution may oxidize metals, metal alloys, $PuO_2$, $UO_2$, or $AmO_2$. Many other compounds produced in the nuclear fuel cycle, such as fission products, may also be dissolved because the oxidation state of the oxidizing ions is high. For example, oxidation of the metals, metal alloys, $PuO_2$, $UO_2$, and $AmO_2$ renders them soluble in the nitric acid or methane sulfonic acid, removing them from the contaminated part or surface, and reducing the oxidizing ion. The reduced ion is re-oxidized in the electrochemical cell. This way, the nitric acid or methane sulfonic acid solution containing the oxidizing ion can be reused multiple times.

Online Measurement of Oxidant and Dissolved Contaminants

The nuclear decontamination system in some embodiments includes an online measurement system configured to measure the oxidizing ion in solution and the dissolved $PuO_2$, $UO_2$, $AmO_2$, or other radionuclides in real-time. The oxidizing ion solution and the dissolved $PuO_2$, $UO_2$, $AmO_2$, or other radionuclides are measured using a UV-V spectrophotometer (or other appropriate measurement method) connected to a dip probe, or using a flow through cell, both of which continuously monitor the system. It should be noted that this feature is not shown in the figures. Measurements at different wavelengths may determine if the electrochemical cell is working properly, and may determine how much $PuO_2/UO_2/AmO_2$/etc., has been dissolved.

Real Time Acoustic Monitoring of the Decontamination Process

The nuclear decontamination system in some embodiments includes a real time, non-invasive, and in situ system for monitoring the thickness of the mechanical structure being decontaminated. Particularly this involves the use of multiple echoes of an acoustic signal that is temperature compensated for the real-time monitoring of thickness changes in an etched plate using acoustic sensors placed on the outside of the decontamination cell during a decontamination process. This innovative approach uses multiple echoes of the acoustic signal to improve precision of thickness measurement, cross-correlation signal processing to improve the accuracy of the thickness measurement, and a novel temperature compensation algorithm to make the technique robust under varying process temperatures.

Using this approach, it is possible to measure the thickness corrected for varying temperature during the actual decontamination process. The measured thickness shows high stability even with a noisy flow system, leading to below 1 μm thickness change sensitivity (or, less than 0.025% change) for a 4.76 mm thick plate. The ability to measure changes in thickness with this very high sensitivity allows for more efficient operation of the system, real-time diagnosis of the decontamination process, and shorter decontamination times.

Removal of $PuO_2/UO_2/AmO_2$/Other Radionuclides from Cleaning Solution

In certain embodiments, the nuclear decontamination system includes a contaminant removal/separation system integrated directly into the decontamination system, configured to remove the dissolved $PuO_2/UO_2/AmO_2$ or other radionuclides from the oxidizing ion solution once the levels have increased to the point that the oxidizing ion solution is no longer efficient for decontamination. Removal can be accomplished by precipitation, and/or selective removal of the radionuclides from the oxidizing ion (or decontamination) solution using resins or liquid/liquid extraction. The oxidizing ions are reduced (e.g., Ce(IV) is reduced to Ce(III)) by reversing the cell potential prior to selective removal of the contaminants because the oxidizing ions would otherwise destroy the resin, organic phase, or other parts of the liquid-liquid extraction system or resin extraction system.

In some embodiments, reduction of the oxidizing ions is achieved using the same electrochemical cell also used for oxidation. This allows for the nitric acid or methane sulfonic acid and oxidizing ion solution to be reused multiple times.

Vacuum Delivery System

The nuclear decontamination system may include a vacuum delivery system configured to seal a fixture to the wall of a contaminated enclosure, and is further configured to deliver, and later recover, the oxidizing ion solution. This allows the oxidizing ion solution to continuously circulate between the fixture and the electrochemical cell. In an embodiment, the fixture is manually placed on the contaminated surface. In another embodiment, the fixture is placed on the surface using a robotic arm. The surfaces to be cleaned can be mapped using a 3-D mapping system and uploaded into the control system of the robotic arm. The robotic arm can then be programmed to place the fixture at different locations on the mapped surface to autonomously clean the contaminated enclosure. Heating elements that heat the decontamination solution can also be added to decrease cleaning time.

Atmospheric Pressure Delivery Sys Tem

In some embodiments, the nuclear decontamination system includes an atmospheric pressure delivery system. The atmospheric pressure delivery system includes a reaction vessel at or near atmospheric pressure, which contains the contaminated part. The reaction vessel is connected to the electrochemical cell and the solution flows continuously between the reaction vessel and the electrochemical cell. The reaction vessel can be integrated with a system for automatically moving the parts in the reaction vessel, or the reaction vessel can be designed with nozzles that provide sufficient pressure to ensure the parts are agitated. An ultrasonic probe or surface can be added to increase agitation and decrease cleaning time. Heating elements that heat the decontamination solution can also be added to decrease cleaning time.

In some further embodiments, a semi- or fully-automated system that receives inputs from the online measurement system, the robotic arm (if used), the online radionuclide removal system, and the electrochemical cell may manage the cleaning of the contaminated part or surface.

FIG. 1 is a diagram illustrating a perspective view of an electrochemical cell 100 which is part of the nuclear decontamination system, according to an embodiment of the present invention. In some embodiments, electrochemical cell 100 includes a container (or cathode compartment) 104 with a lid 102 for the electrochemical cell. A solution comprising of Ce(III), Co(II), or Ag(I) and nitric acid or methane sulfonic acid enters the electrochemical cell by way of pipe 108. A drain 106, which is described in more detail below, may remove the solution from the cathode well of electrochemical cell 100. A drain valve, which is upstream of pipe 108, may be attached to electrochemical cell 100, and in particular, to the anode compartment. The drain valve may be used for draining the solution out of the anode compartment.

Figure 5A:
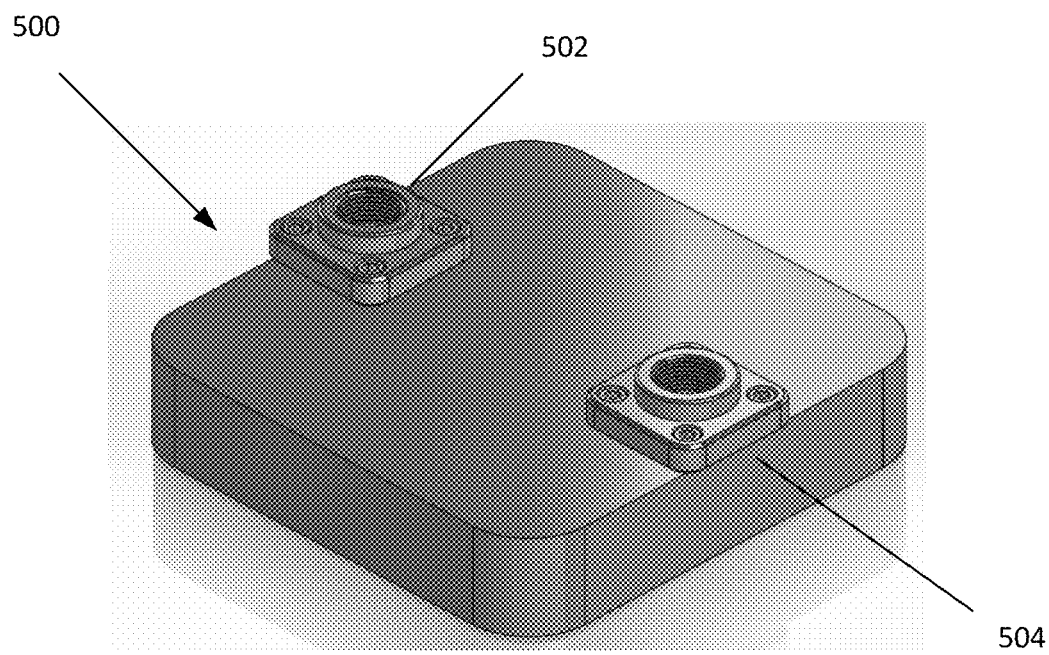
FIGS. 5A and 5B are diagrams illustrating a prospective view of a suction head, according to an embodiment of the present invention.

As discussed above, within the nuclear decontamination system (shown in FIG. 7) is an electrochemical cell 100, either an atmospheric bath (shown in FIG. 7), a nozzle for tank cleaning (shown in FIG. 7), or the cleaning head of FIG. 5A. The connections are made by tubing and pumps. Certain embodiments may also include a radionuclide removal system (shown in FIG. 7) that is connected to any of the systems described above.

Figure 2A:
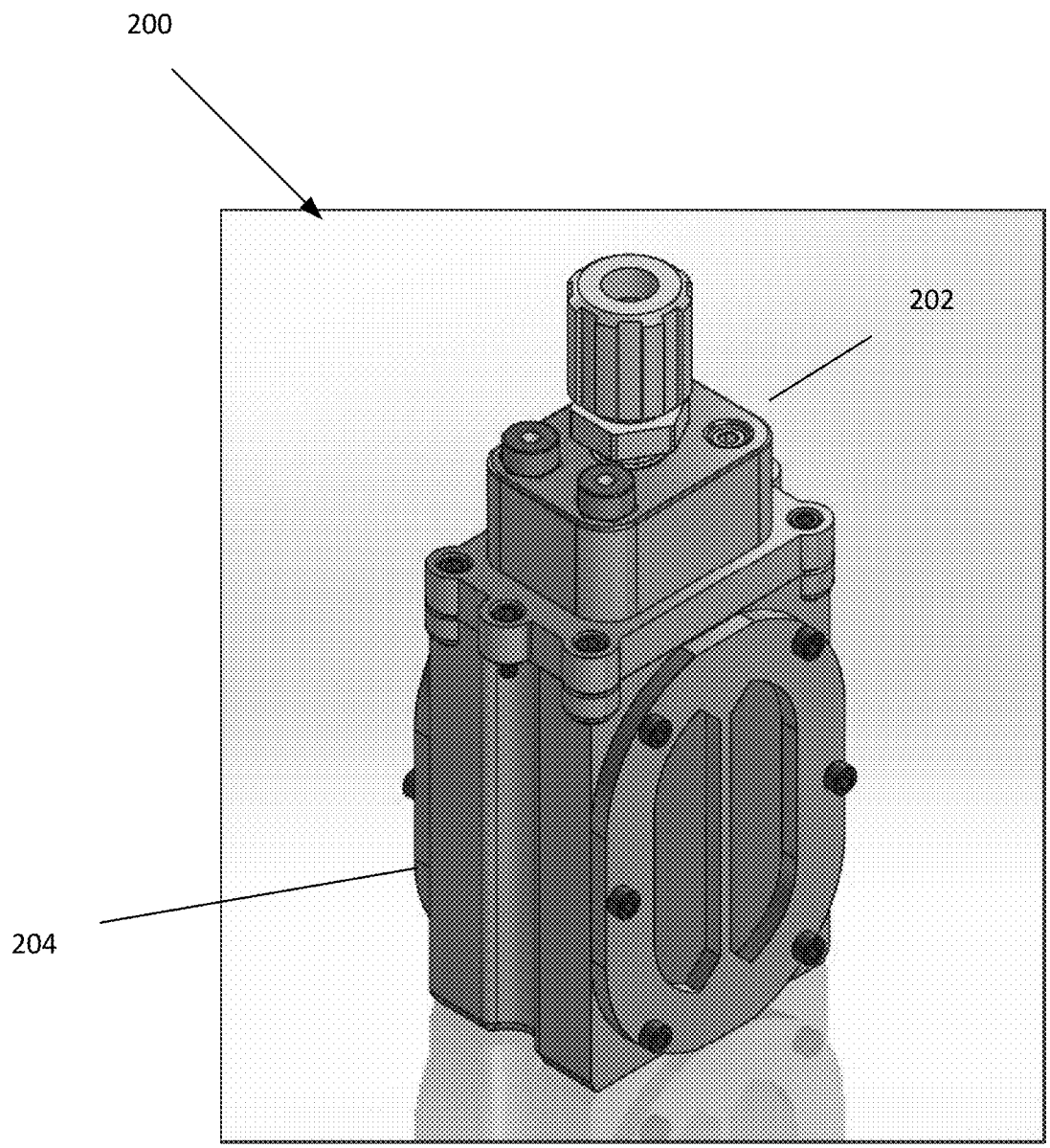
FIGS. 2A-C are diagrams illustrating a perspective view of an anode compartment of an electrochemical cell, according to an embodiment of the present invention.
Figure 2B:
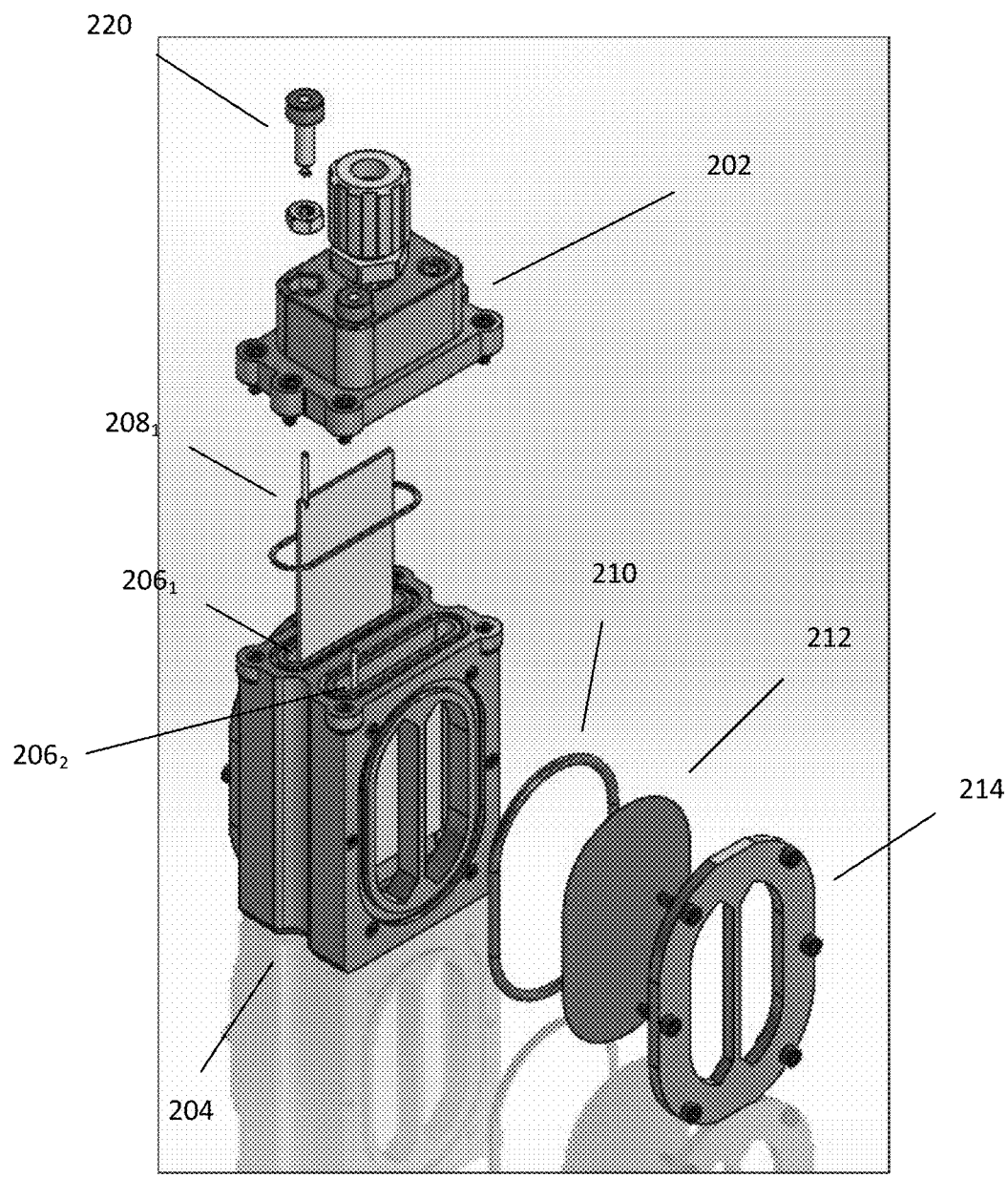
Figure 2C:
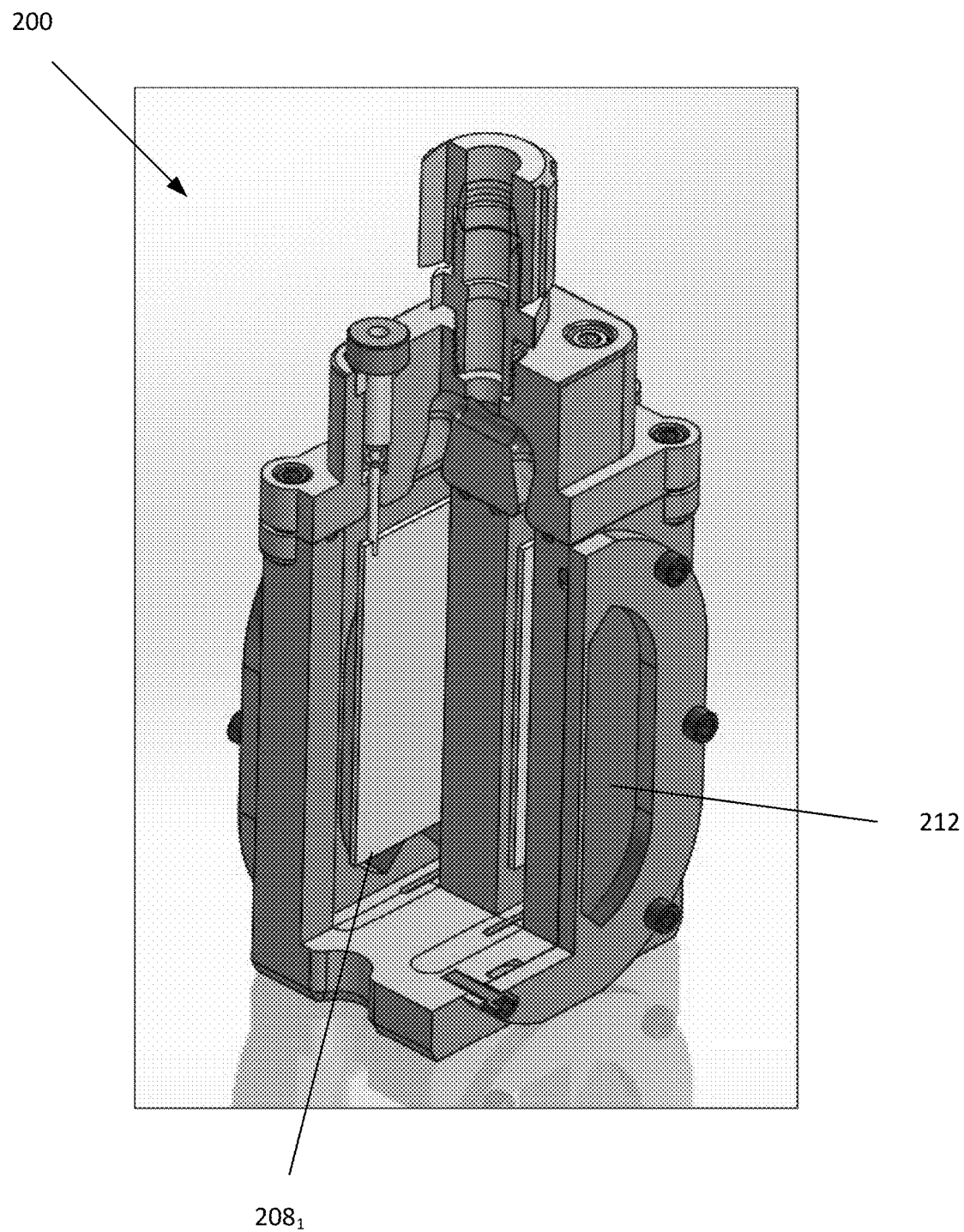

FIGS. 2A-C are diagrams illustrating a perspective view of the anode compartment 200 of electrochemical cell 100 of FIG. 1, according to an embodiment of the present invention. In some embodiments, anode compartment 200 fits into cathode compartment 104 of FIG. 1, and may be composed of two parts—part (cap) 202 and part (base) 204.

In an embodiment, cap 202 includes banana jacks 220 that allow for easy connection to the power supply. In certain embodiments, base 204 includes two anode wells $206_1$ and $206_2$, one for each anode $208_1$ and $208_2$. Although two anode wells $206_1$ and $206_2$ are shown in FIGS. 2A-C, there may be additional anodes depending on the embodiments.

During operation, as the nitric acid or methane sulfonic acid solution containing the Ce(III), Co(II), or Ag(I) enters the anode wells $206_1$ and $206_2$, and is exposed to a potential sufficient to oxidize the ions. The ions become Ce(IV), Co(III), or Ag(II). In an embodiment, anode $208_1$ and $208_2$ is made of platinum. The cathode (see FIG. 4), which is housed in cathode compartment 104, is typically made of titanium or platinum. It should be noted that the ions (Ce(IV), Co(III), or Ag(II)) are capable of oxidizing many high performance steels, and many radioactive compounds. The oxidized ions are soluble in the nitric acid or methane sulfonic acid. The Ce(IV), Co(III), or Ag(II) are reduced during this process and are returned to their lower oxidation states (i.e., Ce(III), Co(II), or Ag(I)). The reduced ions are then returned to anode compartments $206_1$ and $206_2$ via tube 108 (of FIG. 1) and re-oxidized. Depending on the embodiment, additional anodes may be used to increase the regeneration rate of Ce(IV), Co(III), or Ag(II).

Also, in this embodiment, a nafion membrane 212 is placed between an O-ring 210 and a cap 214, such that nafion membrane 212 is affixed to the side of base 204 separating the anode and cathode solutions, but allowing charge transfer. It should be appreciated that a nafion membrane 212 may be placed on both sides of base 204. It should be appreciated that other membranes may be used depending on system requirements.

Figure 3:
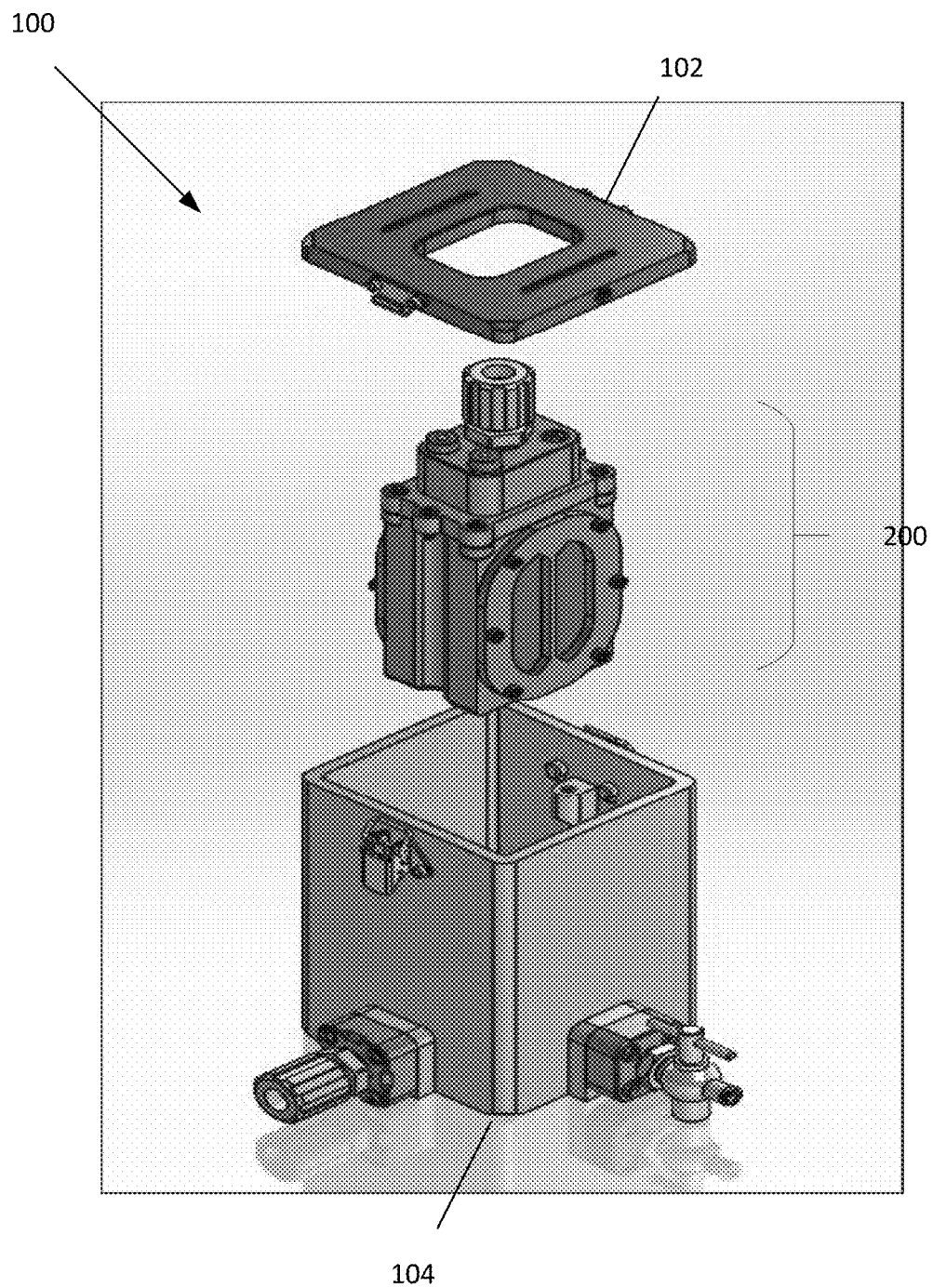
FIG. 3 is a diagram illustrating an exploded view of an electrochemical cell comprising of an anode compartment and a cathode compartment, according to an embodiment of the present invention.

FIG. 3 is a diagram illustrating an exploded view of an electrochemical cell comprising of an anode compartment and a cathode compartment, according to an embodiment of the present invention. The packaging in FIG. 3 shows that anode compartment 200 of electrochemical cell 100 is placed inside of the cathode compartment 104. A lid 102 is placed on top of cathode compartment 104, securing anode compartment 200 therein.

Figure 4:
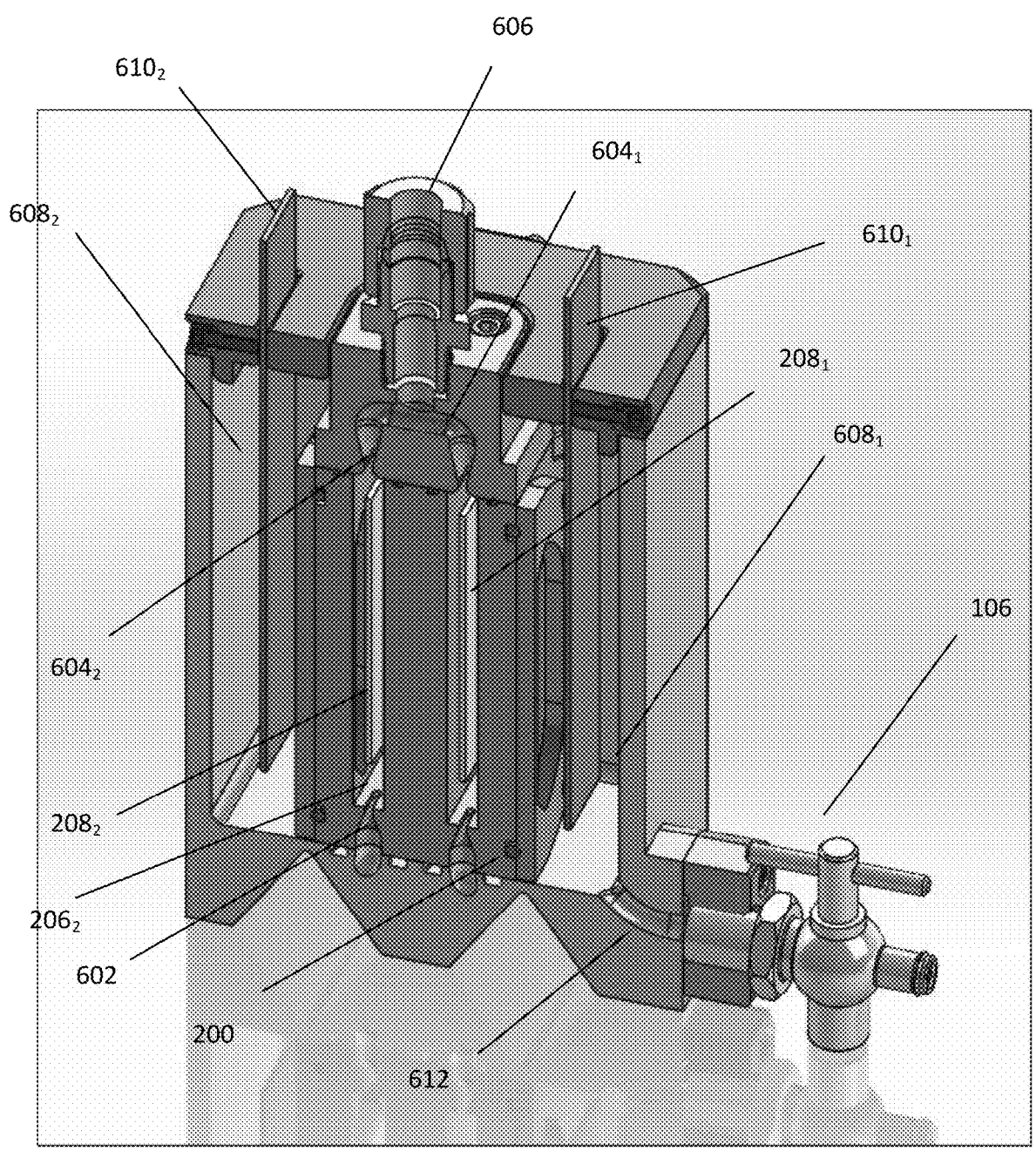
FIG. 4 is a diagram illustrating a cross-sectional view of the electrochemical cell, according to an embodiment of the present invention.

FIG. 4 is a diagram illustrating a cross-section of electrochemical cell 100, according to an embodiment of the present invention. As shown in FIG. 4, once the anode compartment 200 is placed inside of the cathode compartment 104, cathode wells $608_1$ and $608_2$ are created on both sides of anode compartment 200. Anode wells $206_1$ and $206_2$ and cathode wells $608_1$ and $608_2$ are sealed and isolated from each other so that solution cannot pass from anode compartment 200 to cathode wells $608_1$ and $608_2$. However, it should be noted that only charge may pass through the nafion membranes. The cathode wells $608_1$ and $608_2$ contain nitric acid or methane sulfonic acid, in some embodiments. Cathodes $610_1$ and $610_2$ are placed within cathode wells $608_1$ and $608_2$, and are configured to pass charge between the anode compartment 200 and the cathode compartment. This may allow for ions to be oxided in the anode wells $206_1$ and $206_2$.

During operation, solution may enter the anode wells $206_1$ and $206_2$ for oxidation. For example, Ag(I) may be oxidized to Ag(II).

In some embodiments, a drain line 612 leads from cathode well $608_1$ and into drain valve 106. This allows acid, when not in use, to be drained out of the cathode wells. It should be noted that a similar feature may be located on the opposite side of electrochemical cell 100.

Circling back, during operation, solution enters by way of pipe 108 (solution returning from suction head 500 for example), and flows into two separate anode wells $206_1$ and $206_2$ where anodes $208_1$ and $208_2$ reside. The solution flows up and into channels $604_1$ and $604_2$, where the solution is combined and forced out of orifice 606. The converged solution may then be applied to the surface that is to be cleaned (through suction head 500 for example).

Figure 5B:
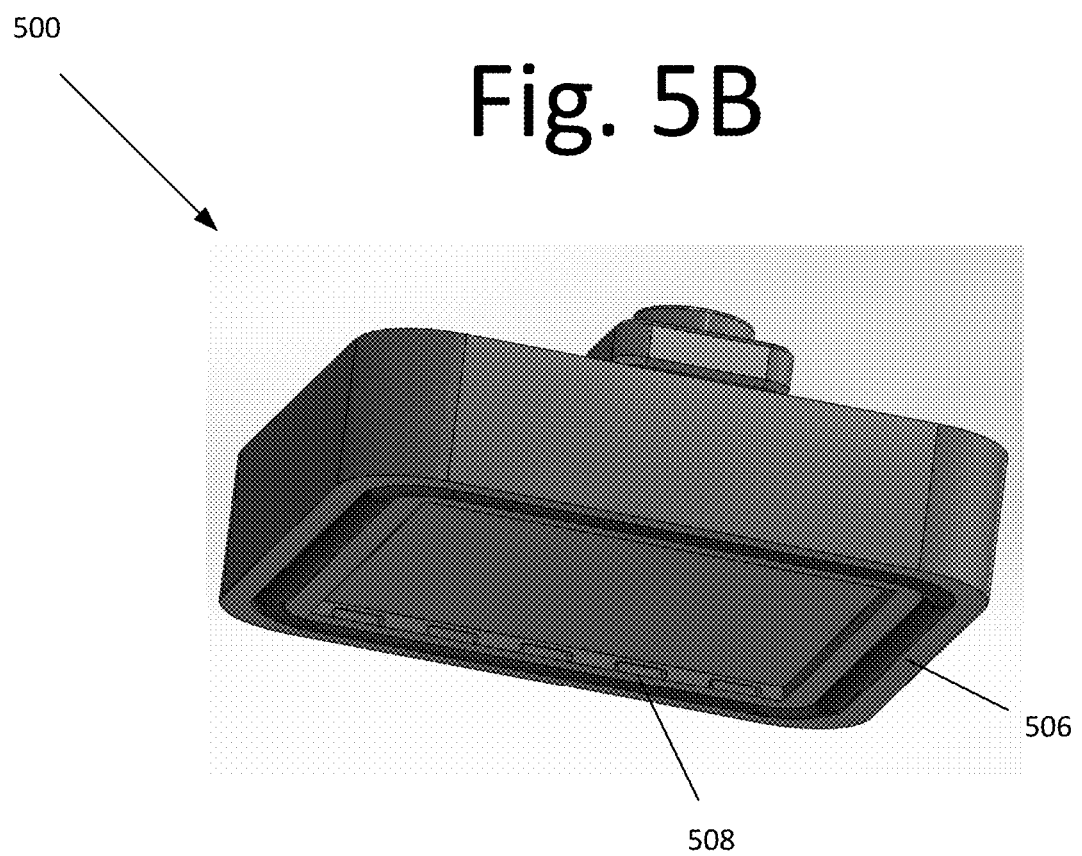

FIGS. 5A and 5B are diagrams illustrating a prospective view of a suction head 500, according to an embodiment of the present invention. In some embodiments, connectors 502, 504 may connect the electrochemical cell of FIG. 1, so the surface can be cleaned. In one example, the solution enters via connector 502 and splits off into multiple channels 506. See FIG. 5B. Channels 506 may direct the solution onto the surface. On the opposite of channels 506 are another set of channels (not shown) that will suck the solution back and return the solution to the electrochemical cell by way of connector 504. It should be appreciated that this suction head system is a closed loop system in this embodiment.

Figure 6:
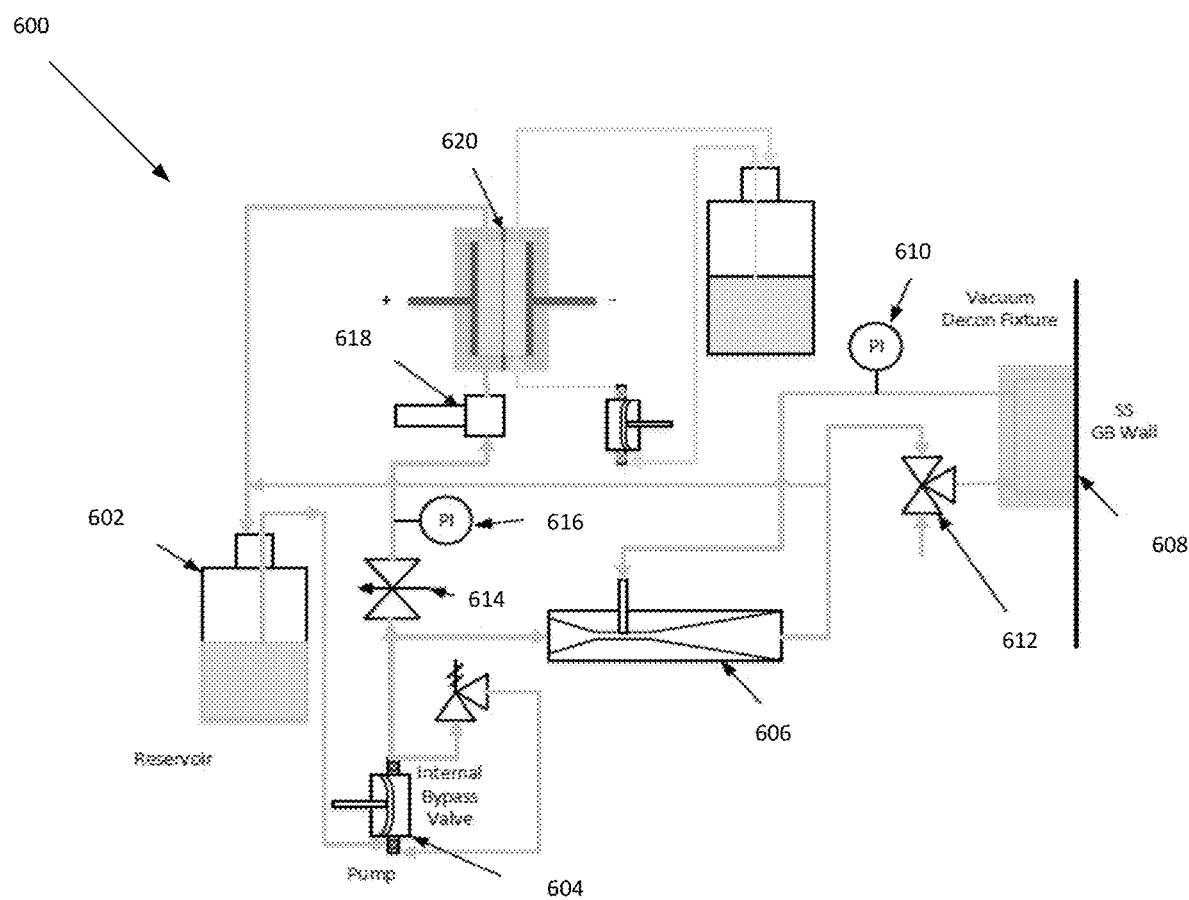
FIG. 6 is a diagram illustrating a system for providing a continuous and stable supply of an oxidizing ion solution to a fixture, according to an embodiment of the present invention.

FIG. 6 is a flow diagram illustrating a system 600 for providing a continuous and stable supply of an oxidizing ion solution to a fixture, according to an embodiment of the present invention. In some embodiments, an oxidizer solution reservoir 602 contains a reservoir of oxidizing solution. This reservoir may have a volume of 2 liters, for example. Diaphragm pump 604 may include an internal bypass configured to limit outlet pressure to 50 psi.

Eductor 606 receives high velocity fluid from a pump and provides suction in a nozzle region. A decon fixture 608, which may be under a partial vacuum, provided by educator 606, may serve to hold a fixture on surface that is being decontaminated. A small gap between surface being decontaminated and a fixture wall provides a high velocity flow that improves mass transfer and contaminate removal.

A pressure indicator (PI) 610 may provide indication to a user regarding the level of vacuum existing within the fixture. A 3-way valve 612 with flow throttling capability may control flow of solution into the fixture. A lower flow may create higher vacuum in the fixture. When the flow is switched to another port (e.g., lower port in FIG. 6), air is sucked into the fixture, sweeps the fixture of liquid, and serves as a vacuum cleaner to cleanup residual fluid in the box. The fixture may also be used to remove excess fluid in the glovebox (GB).

A throttling or needle valve 614 may control flow of liquid into the electrolytic cell 620. Pressure indicator (PI) 616 may provide indication for pressure entering filter 618 and electrolytic cell 620. For instance, pressure entering the electrolytic cell is limited to less than 15 psi, and PI 616 may also indicate when the filter resistance has increased from the accumulation of solids. Filter 618 may remove entrained solids from the flowing solution to protect electrolytic cell 620.

In some embodiments, electrolytic cell 620 may contain two electrode functions, i.e., oxidation at the anode of the active oxidation species (left side of electrolytic cell in FIG. 6) and reduction at the cathode (right side of electrolytic cell in FIG. 6).

Figure 7:
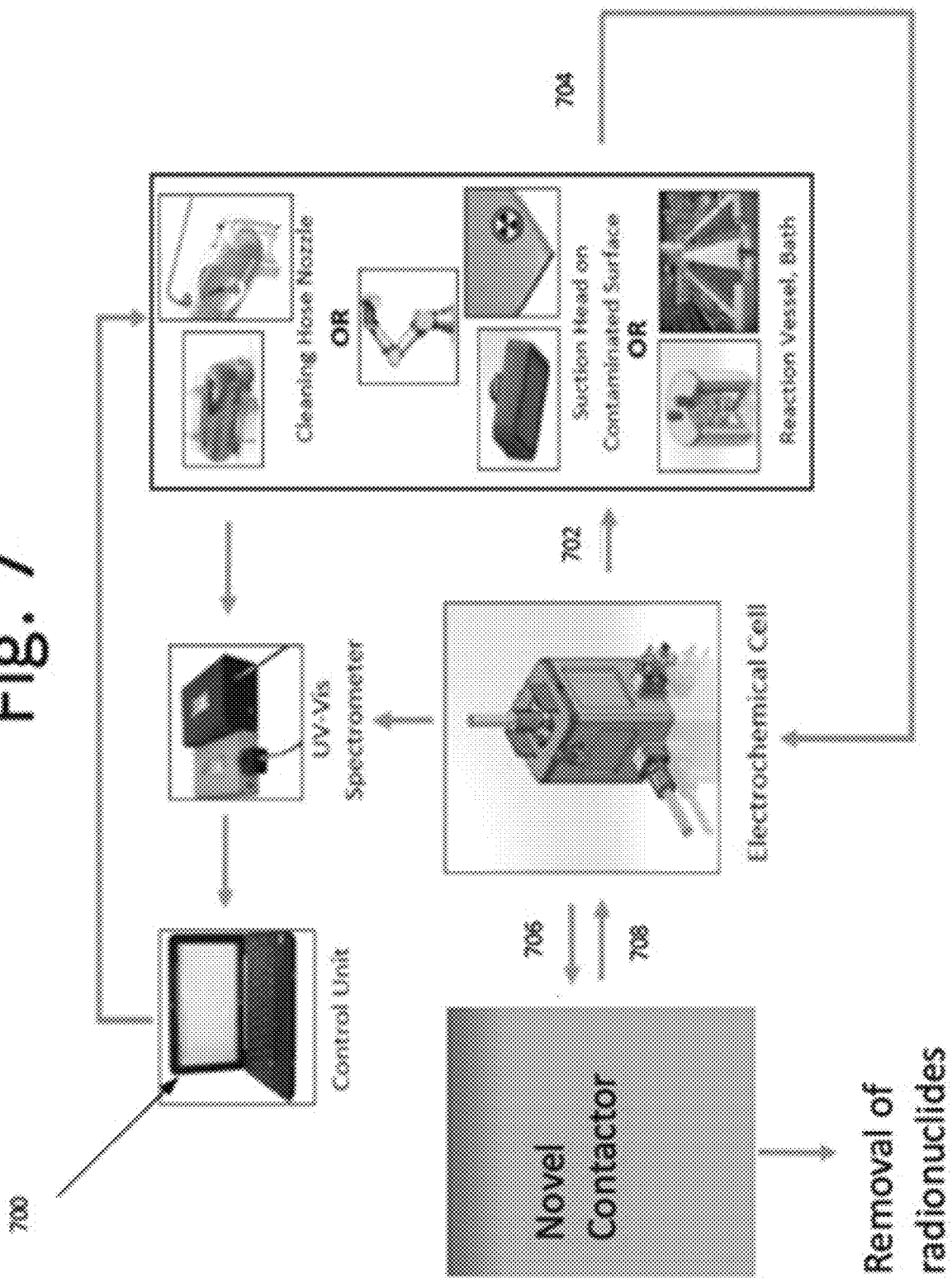
FIG. 7 is a flow diagram illustrating a method for providing a continuous and stable supply of an oxidizing ion solution to a fixture or vessel, according to an embodiment of the present invention.

FIG. 7 is a flow diagram illustrating a method 700 for providing a continuous and stable supply of an oxidizing ion solution to a fixture or vessel, according to an embodiment of the present invention. In some embodiments, method 700 may begin at 702 with the oxidizing solution being sent to a suction head, tank via a nozzle, or a reaction vessel (scalable). At 704, partially reduced solution, dissolved substrate (i.e. stainless steel), and dissolved contaminates is returned to the electrochemical cell. The partially or fully reduced oxidizing ion (e.g. Ag, Ce, Co) is re-oxidized so that it can be re-sent to the contaminated surface multiple times. At 706, once the solution contains sufficient amounts of contamination, the solution is sent to a separation system for cleanup, and at 708, the solution, after cleanup, is returned to the electrochemical cell. Note that the returned solution is a clean solution that is ready for use.

Figure 8:
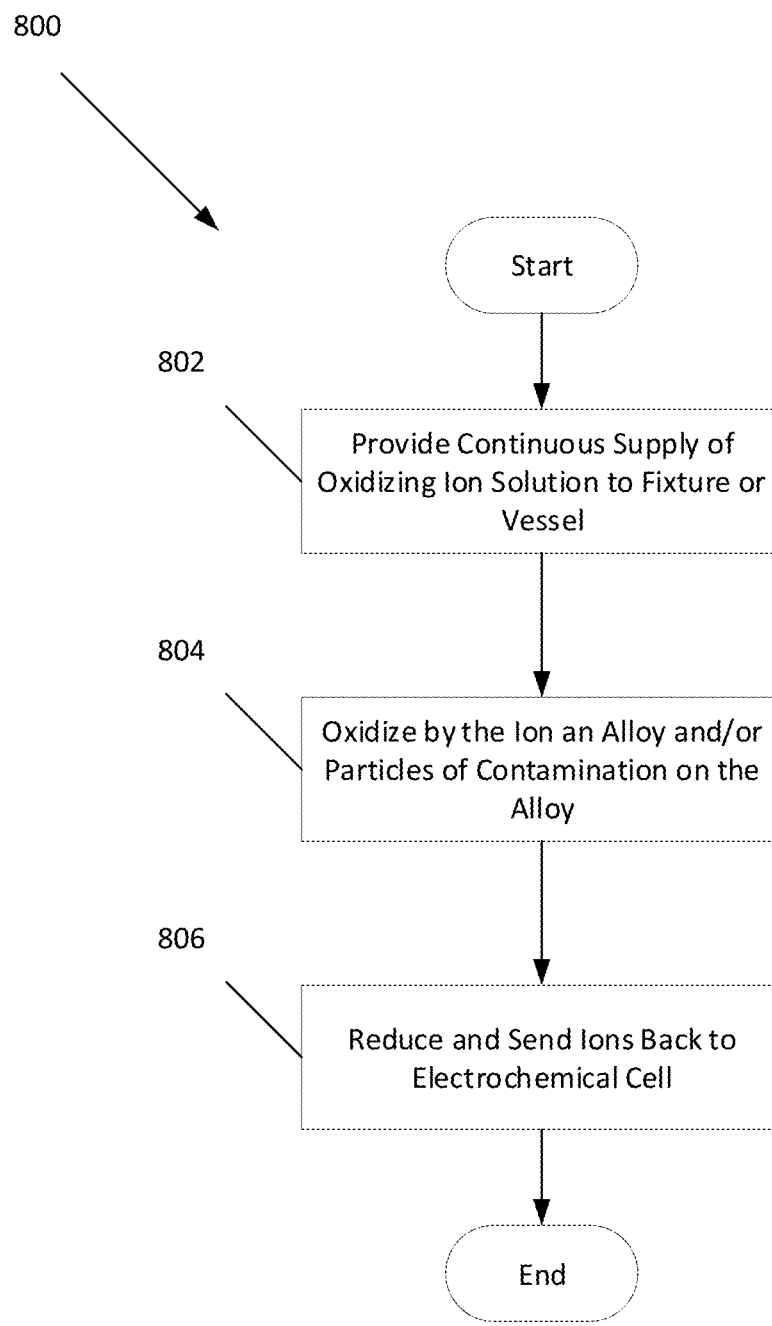
FIG. 8 is a flow diagram illustrating a process for supplying and returning oxidizing ion solution to and from a fixture or vessel, according to an embodiment of the present invention.

FIG. 8 is a flow diagram illustrating a process 800 for supplying and returning oxidizing ion solution to and from a fixture or vessel, according to an embodiment of the present invention. In some embodiments, process 800 may begin at 802 with providing a continuous and stable supply of an oxidizing ion solution to a fixture or vessel. For instance, the oxidizing ion solution is delivered to a fixture or vessel from an electrochemical cell. At 804, the alloy or substrate and/or particles of contamination on the alloy are oxidized by the ions in the oxidizing ion solution for the purposes of dissolving the alloy and/or the particles of contamination. At 806, the ions are reduced and are sent back from the fixture or vessel to the electrochemical cell to be re-oxidized and reused in a closed loop.

Figure 9:
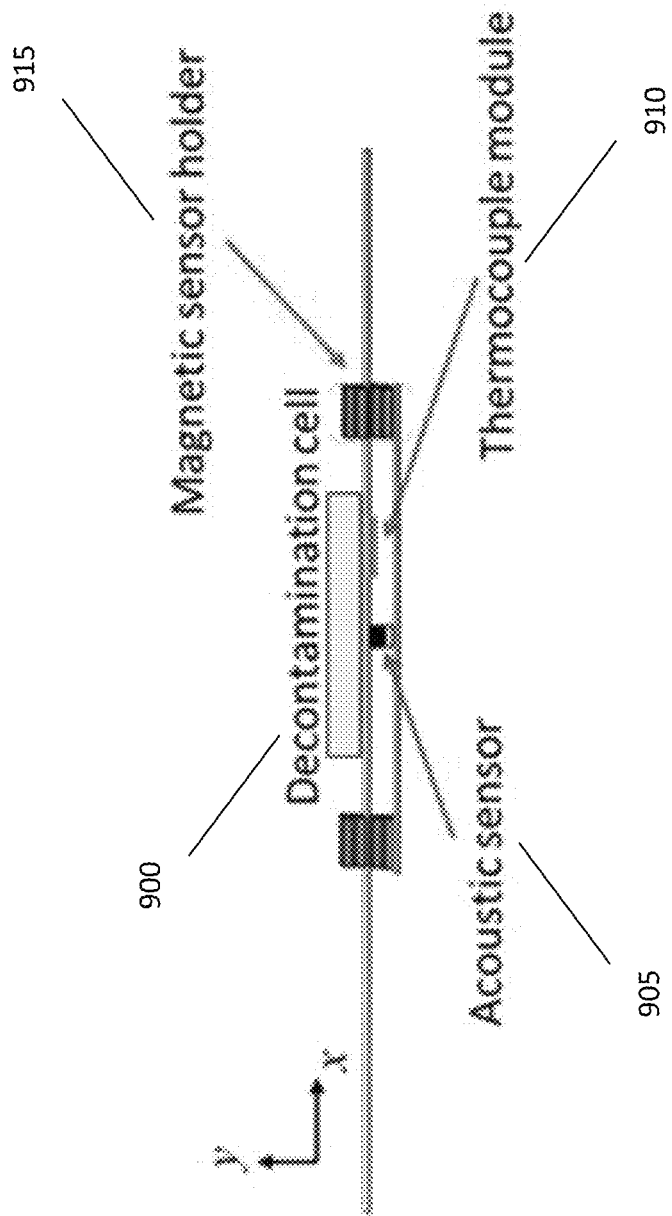
FIG. 9 is an example of how an acoustic thickness monitoring device can be attached to the bottom of the surface being decontaminated to monitor thickness changes in real time, according to an embodiment of the present invention.

FIG. 9 is a cross-sectional view of a decontamination cell 900, according to an embodiment of the present invention. In some embodiments decontamination cell 900 has an acoustic sensor 905 (for thickness measurement) and a thermocouple module 910 (for temperature measurement) attached on the exterior of a plate of cell 900 that is undergoing a decontamination process. Magnetic sensor holder 915 allows for easy attachment, re-attachment at a separate location, and detachment of the acoustic sensor.

Figure 10:
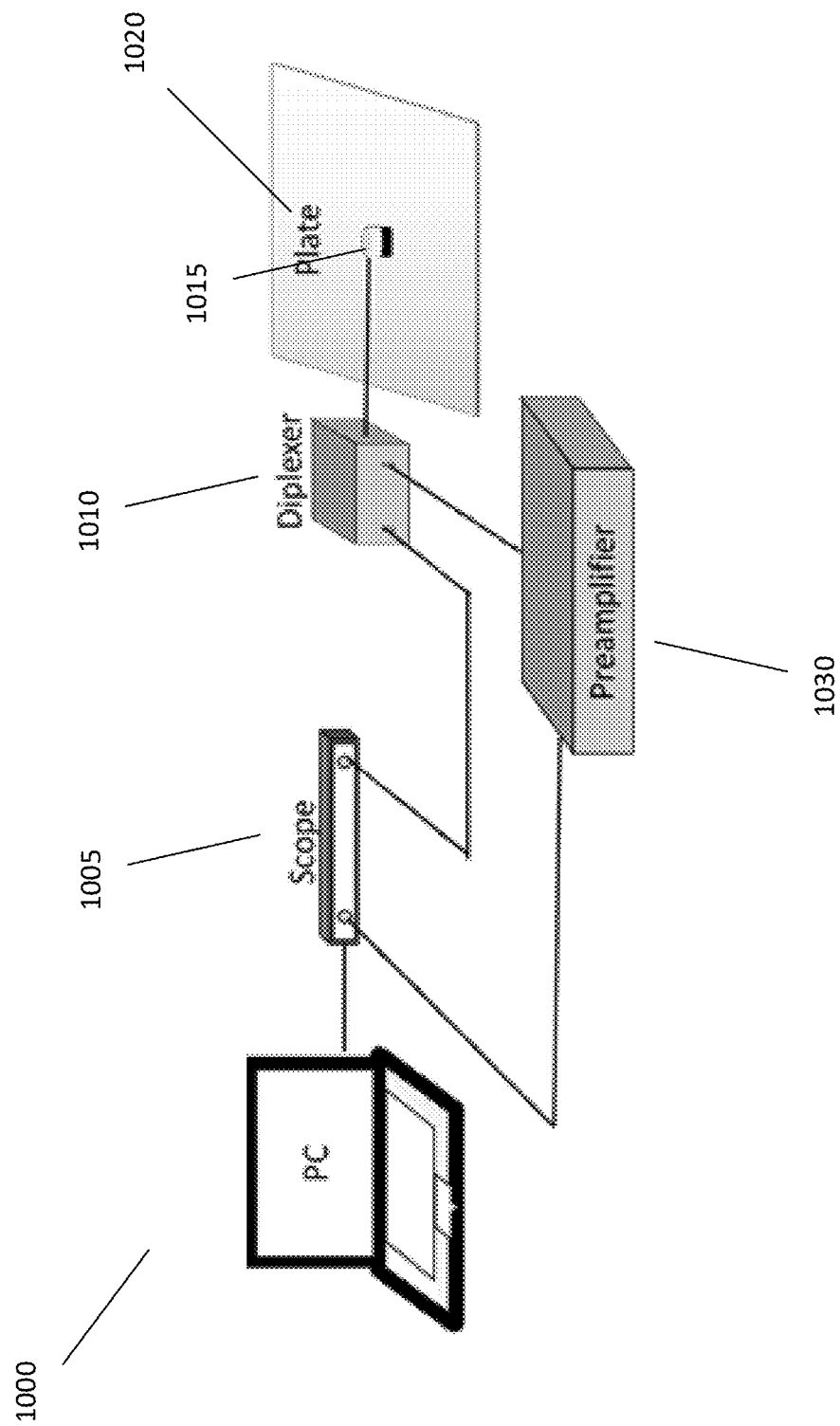
FIG. 10 is an example of the components of the real time thickness monitoring system components, according to an embodiment of the present invention.

FIG. 10 is a schematic diagram illustrating the main components of the acoustic thickness monitoring system 1000, according to an embodiment of the present invention. A digitizing scope 1005 generates acoustic signal, which is sent through a diplexer 1010 to an acoustic sensor 1015 that is attached to a plate 1020. The multiple echoes of the reflected acoustic signal are diverted by the diplexer 1010 to a preamplifier 1030, which amplifies the signal and sends it to an input channel of digitizing scope 1005. The instrument control and data acquisition are achieved with a computer attached to digitizing scope 1005.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus comprising:
    an electrochemical cell configured to oxidize a solution, the electrochemical cell providing a continuous and stable supply of an oxidizing ion solution to a fixture or vessel used for the purposes of decontaminating metal and metal alloys,
    wherein the electrochemical cell comprises an anode compartment configured to oxidize the solution at a rate equal to or greater than a rate of reduction, or for purposes of creating a batch of the oxidizing ion solution,
    wherein the solution comprises nitric acid or methane sulfonic acid containing oxidizing ions, and
    wherein the electrochemical cell is configured to oxidize Ce(III) to Ce(IV), Co(II) to Co(III), or Ag(I) to Ag(II).

2. The apparatus of claim 1, wherein the anode compartment is housed within a cathode compartment of the electrochemical cell,
    a housing of the anode compartment within the cathode compartment forms a cathode well on both sides of the anode compartment.

3. The apparatus of claim 2, wherein the anode compartment comprises a plurality of anode wells, each of which comprises a corresponding anode,
    each of the plurality of anode wells exposes the solution to the corresponding anode, thereby oxidizing the solution therein.

4. The apparatus of claim 3, wherein each of the corresponding anodes is composed of platinum or another anode material.

5. The apparatus of claim 3, further comprising:
    an ion exchange membrane or another membrane affixed to both sides of the anode compartment configured to pass an electron charge from a corresponding one of the plurality of anode wells and into a corresponding one of the cathode wells.

6. The apparatus of claim 5, further comprising:
    a cathode housed within each of the cathode wells configured to create a closed circuit power supply.

7. The apparatus of claim 6, wherein the cathode is composed of titanium.

8. An apparatus comprising:
    an electrochemical cell configured to oxidize a solution, the electrochemical cell providing a continuous and stable supply of an oxidizing ion solution to a fixture or vessel used for the purposes of decontaminating metal and metal alloys, and
    a suction head connected with the electrochemical cell and configured to circulate the solution from the electrochemical cell and onto a surface for decontamination, and back to the electrochemical cell,
    wherein the electrochemical cell comprises an anode compartment configured to oxidize the solution at a rate equal to or greater than a rate of reduction, or for purposes of creating a batch of the oxidizing ion solution.

9. An apparatus comprising:
    an electrochemical cell configured to oxidize a solution, the electrochemical cell providing a continuous and stable supply of an oxidizing ion solution to a fixture or vessel used for the purposes of decontaminating metal and metal alloys, and
    a suction head connected with the electrochemical cell, wherein the suction head comprises a plurality of channels configured to direct the solution from the electrochemical cell and onto a surface for decontamination, and a plurality of corresponding channels configured to redirect the solution from the surface and back to the electrochemical cell,
    wherein the electrochemical cell comprises an anode compartment configured to oxidize the solution at a rate equal to or greater than a rate of reduction, or for purposes of creating a batch of the oxidizing ion solution.

10. The apparatus of claim 1, wherein the solution is delivered to a surface for decontamination by way of atmospheric bath or a nozzle for tanks.

* * * * *